Patented Oct. 5, 1948

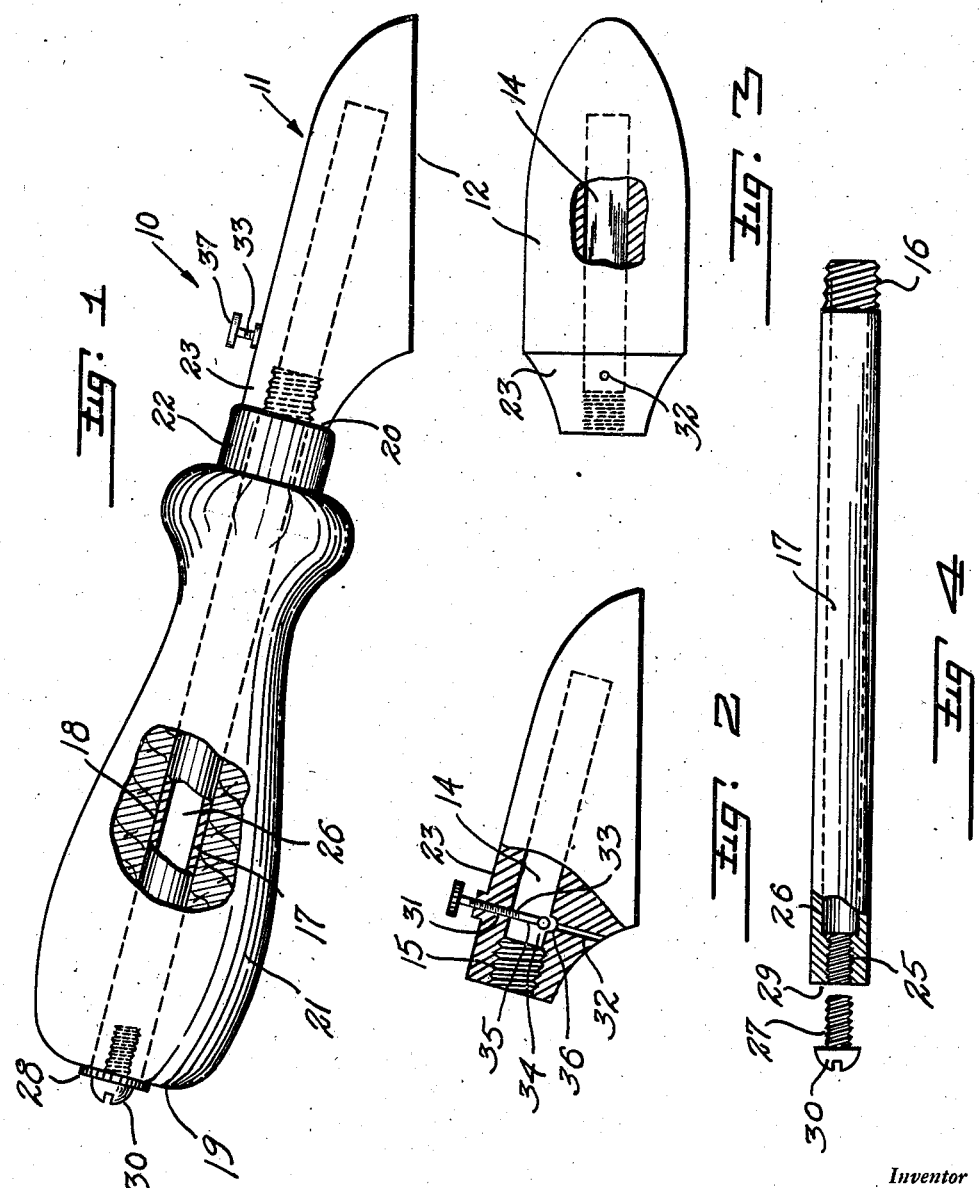

2,450,860

UNITED STATES PATENT OFFICE 2,450,860

LEAD TROWEL

Lester M. Proffit, Superior, Wis.

Application September 18, 1945, Serial No. 617,085

1 Claim. (Cl. 113—111)

My invention is to provide an oil contained trowel for spreading lead.

Another object of my invention is to provide a trowel for automotive body shops to which lead will not adhere.

A further object of my invention is to provide a lead trowel containing an oil reservoir.

A still further object of the invention is to provide a lead trowel having an oil feed and means for controlling the amount of oil supplied to the trowel.

Other features and advantages will become more readily apparent from the following description and the accompanying illustrative drawings in which:

Figure 1 is an elevational view of my invention shown partly broken away,

Figure 2 is a sectional elevation of a trowel,

Figure 3 is a plan view thereof, and

Figure 4 is a detail of an oil supply tube.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

10 indicates my invention which consists of a preferably white metal trowel or molten lead smoothing device 11 having a sad-iron shaped smoothing surface 12. The body portion 11 of the trowel is provided with a longitudinal bore 14 which is threaded at its rear end as at 15 to receive the threaded end 16 of a tubular oil receiving reservoir 17 extending through the longitudinal bore 18 extending from the outer end 19 to the inner end 20 of a handle 21. The screw end 16 of the tube projects beyond the ferrule 22 of said handle for threading into the end 23 of the trowel which is formed with an arcuate oil guiding surface extending upwardly and rearwardly from the rear end of the smoothing surface 12.

The outer end of the tube 17 is provided with a reduced internally threaded extension 25 of the bore 26 of said tube into which is threaded a combined cap and retainer screw 27 for the tube and handle 21. A washer 28 is held against the ends 29 of the tube end 19 of the handle by the head 30 of the screw.

Extending through a threaded bore 31 in said trowel end 23 and in alignment with a feed bore 32, is an elongated screw 33 provided with a ball 34 on its inner end 35 which is adapted to seat in a ball valve seat 36 heading the tube 32. The tube 26 and bore 14 together form an oil container, the flow of which oil therefrom may readily be controlled through the rotation of screw 33 by its integrally formed knurled head 37. The oil emits through the bore 32 to flow upon molten lead or down upon the face 12 of the trowel.

Heretofore, as far as I have been able to learn, wooden paddles have been used for spreading and smoothing molten lead used in repairing broken body and fenders of damaged automobiles in repair shops. These paddles must periodically be dipped into a can of oil to prevent adherence of lead thereto and assist in smoothing the lead. This dipping operation distracts the operator's attention from his torch which often results in bad burns on himself. With my above described device the danger is entirely eliminated as the flow of the oil may be quickly adjusted to suit the amount of lead surface to be operated upon.

While I stated that I prefer to make my trowel from white metal, which has practically no affinity for lead, still it may be made of any material having the same qualities.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that what I claim as new and desire to procure by Letters Patent is:

A lead trowel including a body having a smoothing surface and an arcuate oil guiding surface extending upwardly and rearwardly from the rear end thereof, said body being formed with a longitudinal bore extending inwardly from its rear end, said bore being internally threaded at its rear end, a tubular oil receiving reservoir externally threaded on one end for threading into the threaded end of the bore in said trowel body, aligned bores extending through said trowel body intersecting the longitudinal bore therein, one of said aligned bores being formed with a valve seat at its inner end, said other aligned bore being threaded, a screw threadable through said threaded bore having an operating head on its outer end and a ball valve on its inner end seatable in said valve seat, a ferrule and handle slidably mounted upon said oil receiving reservoir, a threaded set screw engageable in the outer end of said oil receiving reservoir, and a washer on said screw contacting the outer end of said handle to hold said parts in operative position.

LESTER M. PROFFIT.

REFERENCES CITED

The following references are of record in the file of this patent:

UNITED STATES PATENTS

| Number | Name | Date |
|---|---|---|
| 406,133 | Foss | July 2, 1889 |
| 2,184,478 | Slaney | Dec. 26, 1939 |
| 2,184,612 | Eaton | Dec. 26, 1939 |
| 2,190,975 | Brown | Feb. 20, 1940 |
| 2,228,213 | Hillsberry | Jan. 7, 1941 |
| 2,299,627 | Hunter et al. | Oct. 20, 1942 |
| 2,313,830 | Lundbye | Mar. 16, 1943 |
| 2,399,463 | Bryant | Apr. 30, 1946 |